United States Patent [19]

Arslan et al.

[11] Patent Number: 5,444,693
[45] Date of Patent: Aug. 22, 1995

[54] SYSTEM FOR RESTORATION OF COMMUNICATIONS NETWORKS

[75] Inventors: Ahmet V. Arslan, Plainsboro, N.J.; James D. Bobeck, Leesport, Pa.; Jeffrey A. Gerrish, Newburyport, Mass.; David E. McDonald, Plaistow, N.H.

[73] Assignee: AT&T Corp., Murray Hill, N.J.

[21] Appl. No.: 874,773

[22] Filed: Apr. 27, 1992

[51] Int. Cl.⁶ .............................................. H04L 1/22
[52] U.S. Cl. .................... 370/16; 395/182.02; 395/200.01; 395/650
[58] Field of Search .............. 370/13, 16, 16.1; 371/8.1, 8.2, 9.1, 11.1, 11.2, 11.3

[56] References Cited

U.S. PATENT DOCUMENTS

| | | | |
|---|---|---|---|
| 4,665,520 | 5/1987 | Strom et al. | 371/7 |
| 4,956,835 | 9/1990 | Grover | 370/16 |
| 5,295,133 | 3/1994 | Jurkevich | 371/8.2 |
| 5,307,354 | 4/1994 | Cramer et al. | 371/11.2 |
| 5,319,632 | 6/1994 | Iwasaki | 371/11.2 |

*Primary Examiner*—Wellington Chin
*Attorney, Agent, or Firm*—Eugene J. Rosenthal; Ronald D. Slusky

[57] ABSTRACT

Difficulties with prior disrupted communications restoration systems are overcome by employing for each node of a communications network a restoration processor in which predetermined functions of the restoration process are managed by respective ones of a plurality of manager modules. The manager modules are arranged to be directly interconnected only with a so-called restoration manager that coordinates the operations of the modules and provides for their interconnection needs. In a preferred embodiment, four manager modules, a) a user interface manager module, b) a digital cross-connect system (DCS) manager module, c) a distributed communications manager module and d) a core algorithm manager module, are interconnected and coordinated by the restoration manager. Additional robustness to the restoration process is provided by way of enhancements to the functionality of the core algorithm manager module. These enhancements include: a) improved glare processing (resolution of contention for a particular resource), b) "broadcast" of takedown messages, c) elimination of the need for time-outs during automatic restoration, d) a "peek ahead" routine that immediately takes down a needed resource that is already on a list to be taken down, e) use of a "minimax factor" and f) a "quick fix" technique for use in cases of limited failure of circuits between two nodes. The restoration process can also be cascaded so that it sequentially restores one level at a time, the levels being defined by the hierarchy of digital transmission rates employed in the network.

44 Claims, 2 Drawing Sheets

SYSTEM FOR RESTORATION OF COMMUNICATIONS NETWORKS

GOVERNMENT CONTRACT

This invention was made with government support under Contract No. DCA100-88-C-0015 awarded by the Defense Communications Agency (DCA). The government has certain rights in this invention.

TECHNICAL FIELD

This invention relates to distributed control systems for restoring disrupted communication functionality in a network of digital cross-connect systems, and, more particularly, to systems for use in a network experiencing massive communication disruption.

BACKGROUND OF THE INVENTION

Communications networks are susceptible to damage caused by a variety of natural and man-made disasters. Such damage typically occurs in either the digital cross-connect systems of the network or in the transport facilities that interconnect the digital cross-connect systems to each other. In either case, the damage causes communications failures at the trunk level, e.g., DS1, DS3, STS-N (SONET), or corresponding international rates, and all communication circuits passing over a failed trunk are disrupted.

Restoration of disrupted circuits by rerouting the communications they carry over spare circuits in the network is well known. Proposed prior art distributed systems for performing such rerouting employ a plurality of closely interconnected functions. These prior art systems are cumbersome in that they are neither easily upgraded nor are they easily reconfigured to control different types of digital cross-connect systems. Furthermore, they do not demonstrate sufficient robustness, i.e. speed of restoration and number of circuits restored, when there is massive damage to the network.

SUMMARY OF THE INVENTION

The difficulties with prior disrupted communications restoration systems are overcome, in accordance with the principles of the invention, by employing for each node of a communications network a restoration processor in which predetermined functions of the communications restoration process are managed by respective ones of a plurality of manager modules that are arranged to be directly interconnected only with a so-called restoration manager that coordinates the operations of the modules and provides for their interconnection needs.

In a preferred embodiment, four manager modules, a) a user interface manager module, b) a digital cross-connect system (DCS) manager module, c) a distributed communications manager module and d) a core algorithm manager module, are interconnected and coordinated by a restoration manager. The user interface manager module manages the information flow between a user interface and the restoration processor; the DCS manager module is responsible for controlling the DCS in each node; the distributed communications manager module maintains communications with restoration processors in adjacent nodes; and the core algorithm manager module provides provisioning and restoration functionality to determine the actual connections that make up the circuits in the network. The restoration manager controls the overall operation of the restoration processor. To this end, the restoration manager adds any information required for the proper processing of intermodule messages supplied from the modules and it submits for each such message a corresponding work request to the appropriate one of the manager modules.

Other features of the invention provide additional robustness to the restoration process by way of enhancements to the functionality of the core algorithm manager module. These enhancements include: a) improved glare processing (resolution of contention for a particular resource), b) "broadcast" of takedown messages, c) elimination of the need for time-outs during automatic restoration, d) a "peek ahead" routine that immediately takes down a needed resource that is already on a list to be taken down, e) use of a "minimax factor" and f) a "quick fix" technique for use in cases of limited failure of circuits between two nodes. In accordance with another aspect of the invention, the restoration process can be cascaded so that it sequentially restores one level at a time, the levels being defined by the hierarchy of digital transmission rates employed in the network.

DETAILED DESCRIPTION

Figure 1:
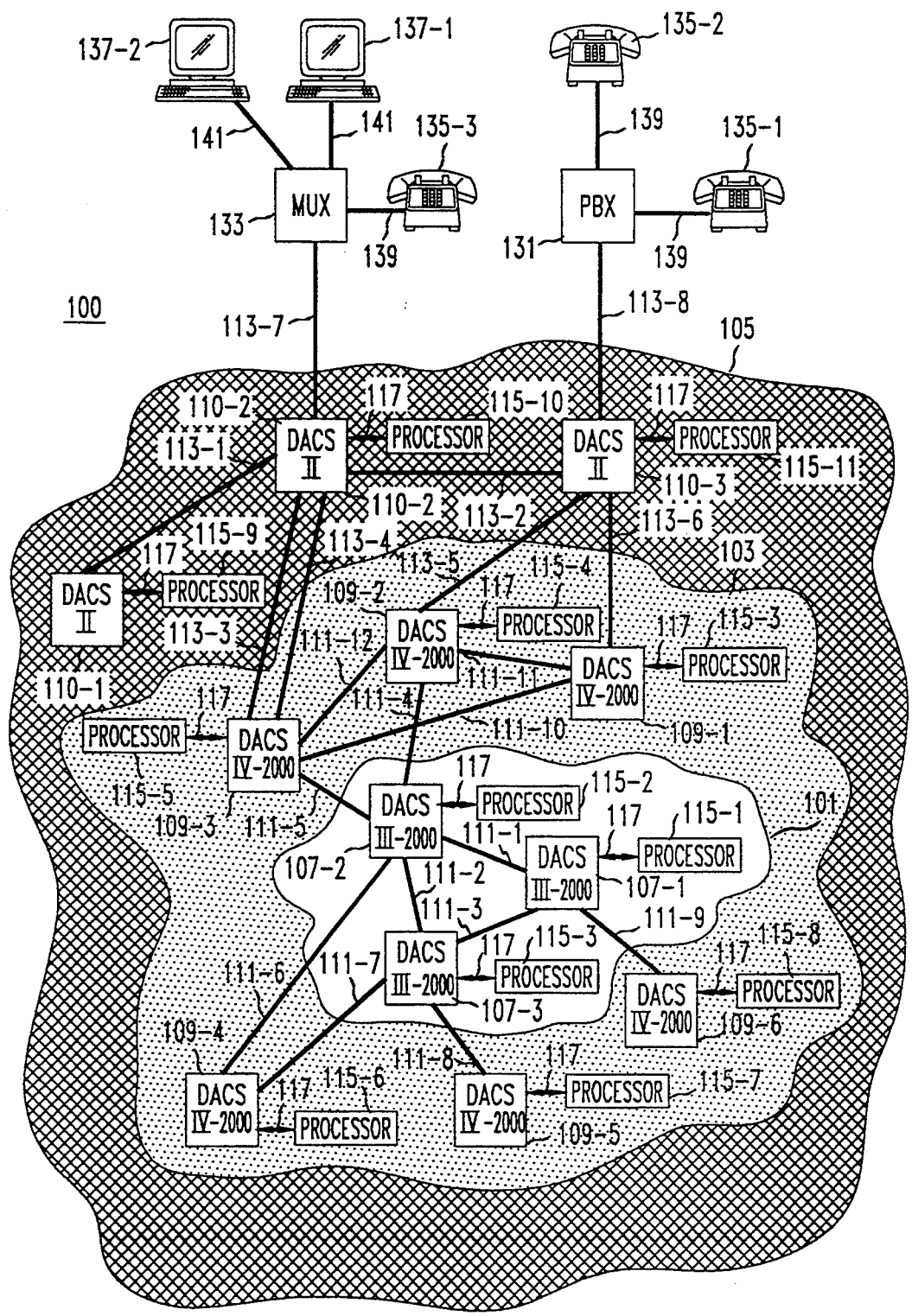
FIG. 1 shows an exemplary telecommunications network, including three network levels, embodying the principles of the invention.

Shown in FIG. 1 is exemplary network 100 divided into network levels 101, 103 and 105. Each network level includes digital cross-connect systems (DCSs) 107, 109, and 110 that switch communication signals at a particular trunk level in the transmission hierarchy, e.g. DS0, DS1 or DS3. Such digital cross-connect systems are exemplified by the DACS product line available from the American Telephone and Telegraph Company. Each digital cross-connect system (DCS) is a node of network 100.

Network 100 includes links 111-1 through 111-12 (collectively links 111) and links 113-1 through 113-6 (collectively links 113) which interconnect digital cross-connect systems 107, 109 and 110 in the manner shown. Each of links 111 represents at least one DS3 trunk and each of links 113 represent at least one DS1 trunk. The actual configuration of any particular embodiment of network 100 is at the discretion of the implementer. Such a configuration would be based on the particular communications needs of the owner of the network. Methods for determining such needs, as well as techniques for designing, developing and implementing such networks, are well known in the art.

Network level 101 includes digital cross-connect systems 107-1 through 107-3, which are referred to herein collectively as DACS III-2000 107 and individually as DACS III-2000 107-X, where X is a number having a value of 1, 2 or 3. Each of DACS III-2000 107 switches signals internally at the DS3 level and each has at least two DS3 interfaces. Links 111-1 through 111-3 interconnect DACS III-2000 107 via their DS3 interfaces.

Network level 103 includes digital cross-connect systems DACS IV-2000 109-1 through 109-6, which are referred to herein collectively as DACS IV-2000 109 and individually as DACS IV-2000 109-Y, where Y is a number having a value from 1 to 6. Each of DACS IV-2000 109 switches signals internally at the DS1 level and each can have DS1 and DS3 interfaces. Links 111-10 through 111-12 interconnect DACS IV-2000 109-1 through 109-6 via their DS3 interfaces.

Network level 105 includes digital cross-connect systems 110-1 through 110-3, which are referred to herein collectively as DACS II 110 and individually as DACS II 110-Z, where Z is a number having a value of 1, 2 or 3. Each of DACS II 110 switches signals internally at the DS0 level and each has at least two DS1 interfaces. Links 113-1 through 113-2 interconnect DACS II 110-1 through 110-3 via DS1 interfaces. It is noted that DS3 interfaces are also available for DACS II.

Links 111-4 through 111-9 connect DACS III-2000 107 to DACS IV-2000 109-2 through 109-6 across the boundary between network levels 101 and 103. Also, DACS IV-2000 109-1 through 109-3 are connected via links 113-3 through 113-6 to DACS II 110-2 through 110-3 across the boundary between network levels 103 and 105. Both the cross-connections (interconnection paths) through each DCS and the channels on each link between DCSs are known as network resources. Network resources are also referred to as capacity for providing transport functions for circuits.

Also shown in FIG. 1 are private branch exchange (PBX) 131 and T1 multiplexer (MUX) 133. These are sources and destinations of information transported via network 100. PBX 131 is connected to DACS II 110-3 via link 113-8. MUX 133 is connected to DACS II 110-2 via link 113-7. Telephones 135-1 and 135-2 are interconnected to PBX 131 via links 139. Links 141 connect MUX 133 with exemplary data sources 137-1 and 137-2. Links 139 also connect MUX 133 with telephone 135-3.

For clarity, a circuit in network 100 is defined as an end-to-end bi-directional connection to interconnect elements outside of network 100. Similarly, a circuit in particular one of network layers 101, 103 and 105 is defined as an end-to-end bi-directional connection provisioned wholly within the particular network layer to interconnect elements outside of that network layer. The source node of a circuit is the node that terminates the circuit in network 100—or in the particular one of network layers 101, 103 or 105—and from which circuit was initially provisioned. The destination node is the other node which terminates the circuit in network 100—or in the particular one of network layers 101, 103 or 105. All other nodes along the path over which a circuit is carried from a source node to a destination node are intermediate nodes for that circuit. Other circuits that could be implemented in network 100 are one way circuits and multipoint circuits. Extension of the invention to such circuits will be obvious to those skilled in the art.

Each of DACS III-2000 107, DACS IV-2000 109 and DACS II 110 is connected to one of restoration processors (processor) 115-1 through 115-12—collectively restoration processors 115—via one of control links 117. Each of restoration processors 115 are identically organized. In other embodiments, more than one digital cross-connect system may be controlled by a single restoration processor.

Figure 2:
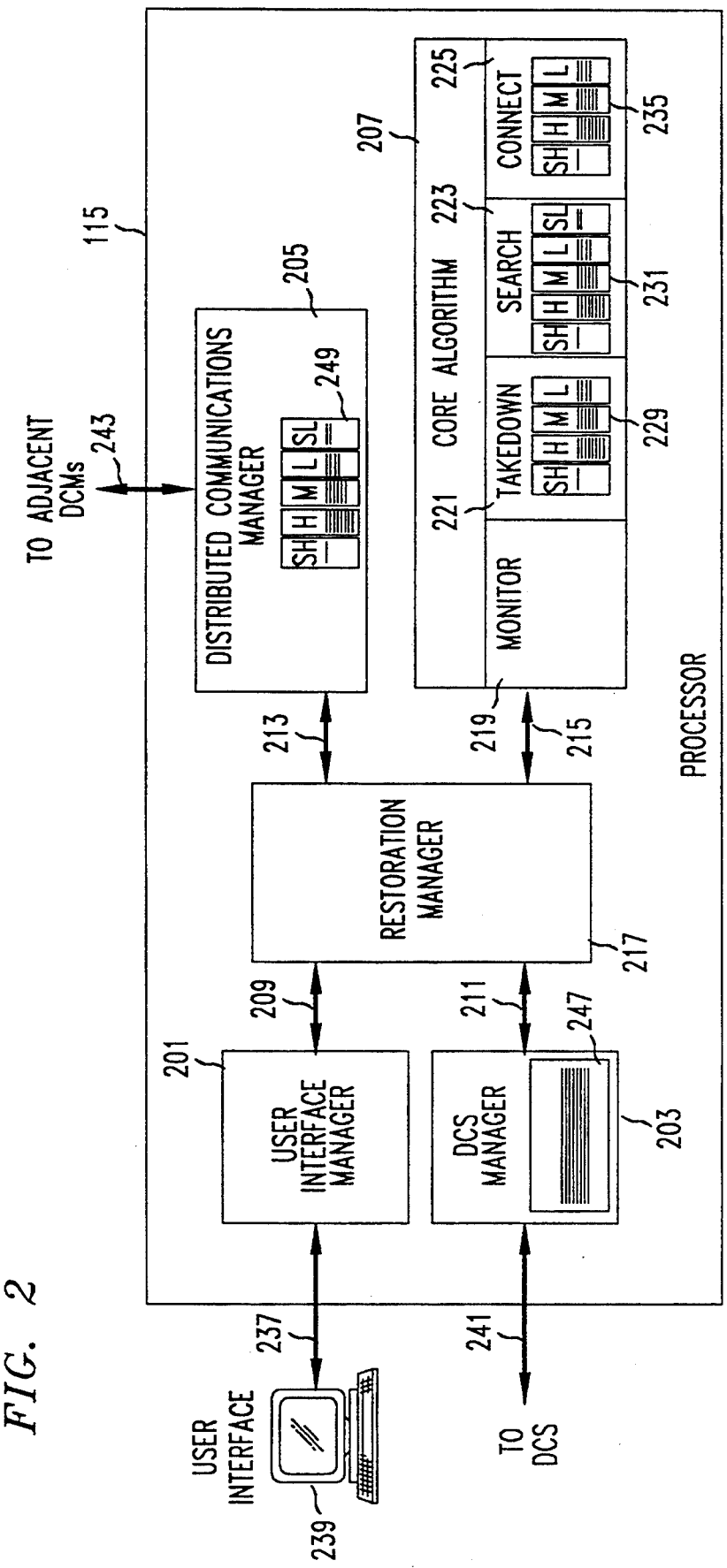
FIG. 2 shows a block diagram view of an exemplary restoration processor.

FIG. 2 depicts, in simplified block diagram form, a more detailed view of an exemplary one of restoration processors 115. In accordance with an aspect of the invention, restoration processor 115 includes: a) user interface manager module 201, b) digital cross-connect system (DCS) manager module 203, c) distributed communications manager module 205 and d) core algorithm module 207. Links 209, 211, 213 and 215, respectively, interface one of the modules to restoration manager 217.

Each of modules 201, 203, 205, 207 is an independent process, as is restoration manager 217. The independent processes may be implemented either on independent processors or as separate, time multiplexed, tasks running on a single processor. Also, in accordance with an aspect of the invention, core algorithm module 207 includes at least monitor function 219, takedown function 221, search function 223 and connect function 225. These functions are also independent processes that may be implemented either on independent processors or as separate, time multiplexed, tasks running on a single processor.

Link 237 connects user interface manager module 201 to exemplary user interface 239. A user interface is a protocol by which a person exerts control over and retrieves information from restoration processor 115. The inputs and outputs of a user interface may relate to a) only restoration processor 115, b) the DCS controlled by the restoration processor 115, or c) other nodes in network 100. In the embodiment shown, user interface 239 is based on a computer type terminal. The design of user interfaces for managing and controlling information is well known.

DCS manager module 203 transmits commands to its associated DCS over link 241. These commands control the interconnections in the DCS. Link 241 also transports responses from the DCS to DCS manager module 203. Link 241 is a part of link 117.

Link 243 connects distributed communications manager module 205 to distributed communications manager modules 205 of other restoration processors 115 that are associated with DCSs which share a direct connection via one of links 111 or 113 to the particular DCS that the restoration processor 115 is associated with. Link 243 transports a plurality of channels, at least one channel for each restoration processor 115 of such adjacent DCSs. The channels of link 243 are bundled together and they are also carded over link 117. Each channel of link 243 is terminated at its associated DCS so that the contents of each channel can be transmitted over predetermined network resources to the adjacent nodes. It is noted that the channels may be implemented as virtual circuits. In one embodiment, each channel is an X.25 connection. In other embodiments, it is possible that the messages carded over link 243 could be transmitted over another shared or dedicated network, such as a packet network, or as SONET overhead.

Restoration processors 115 work separately, simultaneously, and in concert, on various aspects of the process necessary to achieve the restoration of a circuit. Within each of restoration processors 115, modules 201, 203, 205, and 207, restoration manager 217 and functions 219, 221, 223, 225 may be performing their respective aspects of the restoration process for different circuits. Each of restoration processors 115 passes messages to inform modules in other ones of restoration processors 115 about the outcome of their particular aspect of the process. Each circuit can be undergoing processing simultaneously in each of search function 223, takedown function 221, and connect function 225 at different ones of restoration processors 115. In accordance with an aspect of the invention, restoration manager 217 integrates and controls the overall restoration process for a circuit in each of restoration processors 115.

To achieve such integration and control, restoration manager 217 is responsible for maintaining and managing CIRCUIT_STATE elements. A CIRCUIT_STATE element is a description of a circuit.

The parameters in each CIRCUIT_STATE element are determined by the circuit provisioner when the circuit is provisioned. The specifying of such parameters for each circuit is part of the network design process. Again, network design is well known.

A CIRCUIT_STATE element is a description of a circuit. A typical CIRCUIT_STATE element includes parameters for each circuit such as: a) the circuit identifier, b) restoration priority, c) preemption authorization, d) number of segments limit, e) bandwidth, f) trunk conditioning and g) circuit type. Of course, other parameters useful to other network applications, other than restoration, may also be included in the CIRCUIT_STATE element by those skilled in the art. The circuit identifier is a label for identifying each particular circuit and, as noted, each circuit identifier is unique throughout the network. The restoration priority is an indicator specifying the level of priority that should be given to restoring a circuit, relative to other circuits, should the circuit need to be restored. Preemption authorization is an indicator specifying whether or not a circuit is authorized, upon its failure, to preempt network resources that already are being used by circuits having lower restoration priorities, for use in re-establishing itself. The number of segments limit specifies the maximum number of cross-connections that are permitted to be employed when provisioning or restoring the circuit. Bandwidth and trunk conditioning are indicators for the circuit of those properties of the same name, and they are well known in the art. Circuit types are also well known in the art and include: a) point-to-point circuits and b) point-to-multipoint circuits.

The CIRCUIT_STATE element of a circuit is extensively employed during the distributed processing necessary to achieve restoration of that circuit. Restoration manager 217 manages the CIRCUIT_STATE elements by: a) obtaining information relating to each CIRCUIT_STATE element that is required by the module or function to which the element is to be supplied and b) distributing the CIRCUIT_STATE elements to the appropriate module or function.

Distributed communications manager 205 is responsible for at least: a) receiving/decoding and encoding/transmitting inter-restoration processor 115 messages, b) managing flow control for inter-restoration processor 115 messages and c) managing initialization and recovery for inter-restoration processor 115 communications without affecting other modules within the restoration processor 115.

User interface manager module 201 is responsible for managing the information flow of the user interface (UI) to and from the system/network modules via restoration manager 217. This includes at least: a) presenting information to user interface 239, e.g., prompting a user/operator to confirm alarms and to select routes, b) receiving requests for information from user interface 239 concerning the DCS associated with the restoration processor or network 100, c) distributing, via restoration manager 217 the requests from user interface 239 to the appropriate module, and d) receiving, via restoration manager 217, processed information from the other manger modules of restoration processor 115 and presenting that information to user interface 239 for display. In accordance with an aspect of the invention, user interface 239 and its associated user interface manager module 201 are logically distinct from the rest of restoration processor 115, so that new technologies may change user interface 239 with minimal effect on restoration processor 115. For example, a change in the display device employed in user interface 239 would necessitate a change in a device driver located in user interface manager module 201 but would not require a change in any other module of restoration processor 115.

Core algorithm module 207 provides a distributed circuit restoration functionality. It receives work items from restoration manager 217 and processes them in the manner described below.

Restoration manager 217 receives, reformats, if necessary, and properly routes inter-module messages from user interface manager module 201, digital cross-connect system interface (DCS) manager module 203, distributed communications manager module 205 and core algorithm module 207. In addition to routing such messages, restoration manager 217 may retrieve additional information from storage (not shown) to augment the information received in the message if such information is necessary for the function or module to which the message being routed is destined.

Takedown function 221, search function 223, and connect function 225 of core algorithm 207 each has at least one set of work lists. These sets of work lists are, respectively, takedown set of work lists 229, search set of work lists 231 and connect set of work lists 235. Each work list of sets of work lists 229, 231 and 235 stores CIRCUIT_STATE elements supplied by restoration manager 217. These CIRCUIT_STATE elements contain the necessary information that is needed for the processing of the circuit by the function maintaining the work list. Each of the work lists is arranged as a queue. The bottom of each work list is the tail of the queue onto which CIRCUIT_STATE elements are added to await eventual processing. The top of each work list is the head of the queue from which CIRCUIT_STATE elements are removed to be processed. Each time a new CIRCUIT_STATE element is to be processed by one of functions 221,223, 235 or distributed communications manager 205, the CIRCUIT_STATE element processed is the one at the top of the highest priority nonempty work list of the set of work lists for that function.

Each work list of sets of work lists 229, 231 and 235 has a predetermined priority level. These priority levels correspond to the restoration priorities of the circuits in network 100. Also, at least one of the work lists of each of sets of work lists 229, 231 and 235 must have an additional work list having a priority level higher than the restoration priority of any circuit, i.e., a super high (SH) priority level. Furthermore, one of the work lists of search set of work lists 231 must have a priority level lower than the restoration priority of any circuit, i.e., a super low (SL) priority level. As shown in FIG. 2, the work lists not having either SH or SL priority level of each of sets of work lists 229, 231 and 235 have priority high (H), medium (M), and low (L).

Distributed communications manager module 205 also has set of work lists 249, a structure identical to search set of work lists 231. DCS manager 203 has single work list 247 arranged as a queue.

For pedagogical purposes, an exemplary circuit carried over a path from PBX 131 to MUX 133 along link 113-8 through DACS II 110-3 onto link 113-5, through DACS IV-2000 109-2 onto link 111-12, through DACS IV-2000 109-3 onto link 113- 4, and through DACS II 110-2 onto link 113-7 is deemed to have failed and require restoration. DACS II 110-3 is the source node and DACS II 110-2 is the destination node for this circuit.

It is assumed that the cause of the failure for the exemplary circuit is a failure in link 113-5. It is noted that not all the channels carried over link 113-5 need have failed. As a result of the failure, each respective DCS manager 203 in each of restoration processors 115-11, 115-4, 115-5 and 115-10 is associated with DACS II 110-3, DACS IV-2000 109-2, DACS IV-2000 109-3, and DACS II 110-2, respectively, receives an alarm indicating circuit failure. An alarm is a trigger that indicates that at least a portion of a particular circuit has failed and restoration of that circuit is required. Such an alarm can be supplied from the DCS itself, e.g., the well known carrier group alarm (CGA), a user (operator) via user interface 239, or another operation support system external to the network (not shown) or network layer, e.g., another DCS manager in cascaded restoration which is described below. Operation support systems are well-known in the art.

It is assumed herein that each DCS manager 203 along the path detects the failure by receiving a failure indication message via link 241 and supplies an appropriate message indicating the detection of the failure to restoration manager 217. Restoration manager 217 retrieves a record for the failed link and supplies the record and a message indicating the type of failure to monitor function 219. Monitor function 219 "ages" the alarm, i.e., it holds the alarm for a predetermined length of time, to determine if the alarm indicates a true failure.

Alarms that have a duration lasting less than the predetermined length of time tend to indicate transient and self-correcting network problems. One such type of transient problem is disruption of a microwave link caused by electromagnetic disturbances during a thunderstorm. The length of the predetermined time for aging is selected by the implementer in accordance with well known principles. An exemplary predetermined length of time that may be employed for microwave links is ten seconds. A shorter length of time would be appropriate for fiber optic based links. The length of time to age an alarm is predetermined on a link-by-link basis.

If the alarm is canceled, by receipt of an appropriate message by DCS manager 203, within the predetermined length of time, it is deleted by monitor function 219. If the alarm is not canceled during the predetermined length of time, the failure it indicates is determined to be true by monitor function 219.

Failures at each DCS can be divided into two types. The first type of failure is where a DCS is directly connected to a link indicating failure. In the exemplary failure in link 113-5, DACS II 110-3 and DACS IV-2000 109-2 would detect such first type of failures. The second type of failure occurs where a circuit which failed at a link not directly connected to a DCS passes through that DCS. Such second type of failure would be detected by DACS IV-2000 109-3 and DACS II 110-2 for the exemplary circuit and failure described above. It is also possible to trigger restoration by the meeting of predetermined thresholds for particular network performance parameters, such as bit error rate (BER), instead of alarms.

For such first type of failures, monitor function 219 sends a message to DCS manager 203 of the restoration processor 115 associated with that DCS, via restoration manager 217, commanding it to disconnect all the cross-connects (interconnections) that go to the digroup (port) of the DCS on which the alarm is detected. Thus, for the failure described above, monitor function 219 of restoration processors 115-11 and 115-4 disconnect all the failed connections to link 113-5 in DACS II 110-3 and in DACS IV-2000 109-2. All connections for non-failed circuits that pass through DACS II 110-3 and DACS IV 109-2 are left intact. Each DCS manager 203 is responsible for forming appropriate messages to be transmitted to its respective DCS, e.g., DACS III-2000 107, DACS IV-2000 109 or DACS II 110, over links 241.

Restoration manager 217 checks each circuit that was carded on the disconnected link to determine if its associated DCS was the source for that circuit, the destination for that circuit, or merely an intermediate node for that circuit. For the circuit described above, restoration manager 217 of restoration processor 115-11 determines that its associated DCS, DACS II 110-3 is the source node. Similarly, restoration manager 217 of restoration processor 115-4 determines that its associated DCS, DACS IV-2000 109-2 is an intermediate node for the circuit. Via its distributed communications manager 205, restoration processor 115-5 of DACS IV-2000 109-3 determines that it is an intermediate node for the circuit. Similarly, restoration processor 115-10 determines that its associated DACS II 110-2, is the destination node for the failed circuit. Different actions are required, as described below, depending on whether the associated DCS was the source node, intermediate node or destination node. If a circuit pack in a DCS or an entire DCS were to fail, those links cross-connected through the failed circuit pack or DCS will be deemed to have failed by the respective DCS at the opposite ends of those links.

For all failed circuits that a DCS associated with a DCS manager 203 was the source node, e.g. DACS II 110-3, a CIRCUIT_STATE element is supplied by restoration manager 217 to search function 223, via link 215. Search function 223 places each of the CIRCUIT_STATE element at the bottom of the work list of search set of work lists 231 that has the same priority level as the restoration priority of the circuit specified.

For each disrupted circuit that a DCS associated with a DCS manager 203 is an intermediate node, in this example DACS IV-2000 109-2 and 109-3, restoration manager 217 sends takedown information, with the appropriate CIRCUIT_STATE element, to distributed communications manager 205, for transmission to distributed communication manager 205 of adjacent restoration processors 115 of nodes that this circuit traverses. Herein, distributed communication manager 205 for DACS IV-2000 109-2 will transmit a takedown message to distributed communication manager 205 for DACS IV-2000 109-3. Takedown information indicates a particular circuit should be disconnected, i.e., taken down, and includes: 1) circuit identifier, 2) restoration priority, 3) from node, 4) to node, 5) source node and 6) destination node. The takedown information for each circuit is placed at the bottom of the appropriate priority work list of DCM set of work lists 249.

A takedown message for one of the circuits passing over link 113-5 is received by restoration processor 115-5 for DACS IV-2000 109-3, via distributed communications manager 205, from restoration processor 115-4. Restoration processor 115-5 determines that DACS IV-2000 109-3 is an intermediate node for the circuit. Restoration manager 217 of restoration processor 115-5 inserts a CIRCUIT_STATE element for the circuit to be taken down at the bottom of the work list of corresponding priority of takedown function 221. When the CIRCUIT_STATE element of the failed circuit rises to the top of the highest priority nonempty work list of takedown set of work lists 229, takedown function 221 knows how the circuit is cross-connected in DACS IV-2000 109-3, i.e., restoration manager 217 knows from which input digroup and channel and to which output digroup and channel the circuit is cross-connected in DACS IV-2000 109-3. The cross-connection information is supplied by takedown function 221 to DCS manager 203 via restoration manager 217.

DCS manager 203 develops a disconnect command for the determined connections and places the command in its first in, first out (FIFO) work list 247. When the message reaches the head of work list 247, it is transmitted to DACS IV-2000 109-3, which responds by disconnecting the specified connection. It is noted that a circuit could be a NxDSn circuit and, therefore, it may be supported by multiple connections in a DCS. Upon successful disconnection of the cross-connection by DACS IV-2000 109-3, an acknowledgment message will be received by restoration processor 115-5.

Distributed communications manager 205 of restoration processor 115-5 receives a takedown message from distributed communications manager 205 of restoration processor 115-4, because their respective DCS are adjacent. Since DACS IV-2000 109-3 is an intermediate node of the circuit described above, distributed communications manager 205 of restoration processor 115-5 forwards the takedown message to the distributed communications manager 205 of restoration processor 115-10. Thereafter, distributed communications manager 205 forwards the message to restoration manager 217, which passes the appropriate CIRCUIT_STATE element to takedown function 221. Takedown function 221 places the CIRCUIT_STATE element on the corresponding priority work list of takedown set of work lists 229. Eventually, the CIRCUIT_STATE element will be processed to takedown the cross-connections via DCS manager 203, as described above.

Distributed communications manager 205 of restoration processor 115-10 receives a takedown message from distributed communications manager 205 of restoration processor 115-5, because their respective DCS are adjacent. Since DACS II 110-2 is the destination node of the circuit described above, distributed communications manager 205 of restoration processor 115-10 does not forward the takedown message anywhere else. Takedown function 221 places the CIRCUIT_STATE element on the corresponding priority work list of takedown set of work lists 229. Eventually, the CIRCUIT_STATE element will be processed to takedown the cross connections via DCS manager 203, as described above.

Search function 223 performs essentially the same process whether the node associated with it is an intermediate node or a source node for the failed circuit. However, the source of the information upon which search function 223 operates is derived from takedown 229, via restoration manager 217, if a takedown message was received from an adjacent node. Alternatively, the source of the information processed by search function 223 is from monitor function 219, via restoration manager 217, if the failure was detected directly at the associated node of the restoration processor.

Search function 223 removes the top CIRCUIT_STATE element from the highest priority nonempty work list of search set of work lists 231 and checks to determine if there are available resources that would allow a connection to be established between its associated DCS and a neighboring DCS. One source of available resources is spare capacity. Another source of available resources is capacity that can be preempted. Such preemptable capacity is only available if the circuit being restored has preemption authority. Search function 223 will initially look for spare capacity and only if none is available will it check for preemptable capacity. It is also possible to implement the restoration in such a way that only particular circuit types could preempt other particular circuit types, leaving the spare capacity to higher priority circuits. In this embodiment, spare capacity is checked first, for all circuit types.

If capacity is determined to be available, search function 223 transmits a search message, via restoration manager 217 and distributed communications manager 205, to each adjacent restoration processor to which a connection exits. This search message includes at least a list of the nodes, taken by the search message from the source node of the circuit until the adjacent node, i.e., the nodal pathway traversed by the search message, and an associated cost of using that nodal pathway. The cost of using a nodal pathway is the sum of the costs of using the resources that interconnect the nodes of the pathway up through and including the current node. The cost for using each resource is predetermined and each cost is designated by the implementer.

In addition to updating the nodal pathway and the associated cost of using that pathway, a so-called "minimax factor" is included as a part of each search message, in accordance with an aspect of the invention. The minimax factor is updated at each node in the nodal pathway. The minimax factor is the minimum, over all the nodes in the pathway, of the maximum number of spare channels available between each node in the pathway and the next node in the pathway to which it connects. For each node adjacent to a source node, the minimax factor is the maximum number of spare channels between the source node and each respective adjacent node. Each intermediate node employs as the minimax factor, the minimum of the minimax factor that it received from the preceding node and the maximum number of spare channels that it has available to the next node in the pathway.

In accordance with an aspect of the invention, the minimax factor is used by the destination node as a tie breaker for selecting between nodal pathways found, as a result of the searching process, that are of equal cost. In the case of equal lowest costs, the destination node chooses to reconnect the circuit over the one of the equal cost pathways having the highest minimax factor. Thus, the route having the higher minimax factor is considered to have the lower cost and the most available capacity. Restoration manager 217 manages the insertion of the connect elements into the CIRCUIT_STATE element, and thus, the collection of routes ordered by minimax factors.

When restoration manager 217 receives a message containing search information for a circuit from a neighboring intermediate node, via one of distributed communications manager 205, it forms a CIRCUIT_S-

TATE element appropriate for use by search function 223. In this embodiment of the invention, restoration manager 217 extracts the information for the CIRCUIT_STATE elements from the search message. In other embodiments, some of the information may be obtained by restoration manager 217 from a storage facility (not shown) with which it is associated. This CIRCUIT_STATE element is placed on the bottom of the work list of search set of work lists 231 that has the same priority level as the restoration priority level of the circuit. In each restoration processor 115 associated with a node that is the source node of a circuit, search function 223 will prepare messages for the CIRCUIT_STATE element at the top of the highest priority nonempty work list of search set of work lists 231 for transmission to each of its neighbors to which it has spare or preemptable capacity.

Each intermediate node may receive a plurality of messages containing search information for any particular circuit. This is because there may be multiple routes from the source node to the destination node of a circuit that pass through any particular intermediate node. Therefore, when preparing messages for each adjacent node, search function 223 will compare the minimum previously transmitted cost for a circuit with the cost for the circuit to be included in the message being prepared. If the minimum previously sent cost was less than the cost of the message being prepared, the message being prepared is discarded. If the cost of the message prepared is less than that of the previously transmitted minimum cost message, the current message will be transmitted.

For the above described exemplary circuit, restoration processor 115-5 for DACS IV-2000 109-3 will receive search messages from restoration processors 115-3, 115-4 and 115-2 for DACS IV-2000 109-1, DACS IV-2000 109-2 and DACS III-2000 107-2 respectively. It is assumed, for ease of exposition, that the cost of employing any link in network 100 is 1. Therefore, all updated costs will simply be one more than the received costs and the received costs can be examined for comparison purposes. It is also assumed that all channels in link 113-5 have failed. Therefore, the following relevant route/cost associations to intermediate node DACS IV-2000 109-3 exist: route 1—DACS II 110-3, link 113-6, DACS IV-2000 109-1, link 111-11, DACS IV-2000 109- 2, link 111-12, at a cost of 3; route 2—DACS II 110-3, link 113-6, DACS IV-2000 109-1, link 111-11, DACS IV-2000 109-2, link 111-4, DACS HI-2000 107-2, link 111-5 at a cost of 4; and route 3—DACS II 110-3, link 113-6, DACS IV-2000 109-1, link 111-10 at a cost of 2.

If restoration processor 115-5 for DACS IV-2000 109-3 first receives a search message having route 1 as its nodal pathway, that message is updated and forwarded to the restoration processors of adjacent nodes DACS III-2000 107-2 and destination node DACS II 110-2. If, thereafter, restoration processor 115-5 receives a search message having route 2 as its nodal pathway, since the associated cost of route 2 is greater than that of route 1, the search message specifying route 2 is discarded. If further thereafter, restoration processor 115-5 receives a search message having route 3 as its nodal pathway, since the associated cost of route 3 is less than that of route 1, the search message specifying route 2 is updated and forwarded to the restoration processors of adjacent nodes DACS III-2000 107-2 and destination node DACS II 110-2.

There are several other types of messages that are discarded while under preparation. These are: a) messages to be sent to a node that is already included in the nodal pathway that was received from a preceding node, b) messages that will cause the number of segments limit of a circuit to be exceeded, c) messages to nodes on a predetermined node avoidance list, d) messages having an infinite cost that are to be transmitted to a node where a message having a finite cost has already been sent and e) search messages containing a nodal pathway that requires the use of resources at different levels. One may choose to employ a node avoidance list to foster robustness by encouraging physically diverse routing.

Each search message received in an intermediate node is prepared by: a) replacing the received cost with the new cost, b) replacing the received minimax factor with the new minimax factor and c) updating the nodal pathway by adding to it the destination node of the message. This message is supplied to distributed communications manager 205 via restoration manager 217 and placed on the work list of distributed communications set of work lists having the same priority level as the restoration priority of the circuit. When a search message becomes the top of the highest priority nonempty work list of set of work lists 249, it will be transmitted to the appropriate adjacent one of restoration processors 115.

Eventually, if a path exists from the circuit source node to the circuit destination node, distributed communications manager 205 of restoration processor 115 of the destination node will receive at least one search message. In this example, search messages would be received by restoration processor 115-10. The received information is supplied as a CIRCUIT_STATE element to search function 223, via restoration manager 217, and placed on the work list of search set of work lists 231, of proper priority, as for any received search message. When the CIRCUIT_STATE element reaches the top of the highest priority nonempty work list of set of search work lists 231, search 223 retrieves it and determines that its associated node is the destination node. Restoration manager 217 stores the nodal pathway received, the associated cost of employing that pathway and determines if the received nodal pathway is valid. The determination of the validity of nodal pathways is discussed below.

A time-out that source nodes in prior art systems employ to indicate that no routes to the destination node can be found is eliminated, in accordance with the aspect of the invention, by assuring that a search message always arrives at the destination from the source if there is connectivity between the source and destination. Connectivity is defined as the existence of an available path for carrying messages between ones of restoration processors 115. However, even if a search message arrives at the destination, thereby indicating that there is connectivity between the source and destination, there may not be any capacity available to support a circuit from the source node to the destination node along the nodal pathway taken by the message. Therefore, in accordance with an aspect of the invention, if there is no capacity between a node and an adjacent node, the search information is updated and forwarded to the adjacent node via distributed communications manager 205, as described above, but with an infinite cost. Furthermore, the information is placed on the super low priority list of distributed communications manager set of work lists 249. This infinite cost message indicates that at least one point along the nodal pathway taken by that message from the source to the destination has no capacity, even though there is guaranteed connectivity between the source and destination. As is well known in the art, an infinite number may be indicated by a predetermined symbol or the largest number that will fit in a predetermined numeric field.

The nodal pathway specified in a message having infinite cost is not a valid pathway over which to restore a circuit. However, restoration manager 217 of the destination node knows that an unsuccessful search attempt has taken place upon receipt of an infinite cost route. The received search information is stored in restoration processor 115 of the destination node by restoration manager 217. For example, if no capacity existed between DACS II 110-3 and 110-2 via link 113-2, a search message would be sent from restoration processor 115-11 to restoration processor 115-10 having an infinite cost.

If a destination node received a search message with a finite cost, i.e., a search message indicating a valid route, restoration manager 217 supplies to connect function 225 the search information, in the form of a CIRCUIT_STATE element, including at least a) the nodal pathway, b) the trunk code, and c) the preemption authorization. Connect function 225 places the CIRCUIT_STATE element on the bottom of the work list of connect set of work lists 235 having the same priority level as the circuit to be restored.

Restoration manager 217 does not place CIRCUIT_STATE elements on connect set of work lists 235 for nodal pathways having an infinite cost. In accordance with the aspect of the invention, restoration manager 217 recognizes that, if the destination node receives an infinite cost pathway from an adjacent node, there is no capacity available between the source node and the destination node over that path. In response to a no capacity available condition, restoration manager 217, of the restoration processor 115 associated with the destination node, will send a search complete message, which is a search message having a failure indication flag set and an infinite cost, toward the restoration processor 115 associated with the source node. This indicates that the search failed because there was no available capacity to connect the source and destination nodes. The message to the source node is sent from the destination node via the nodal pathway having infinite cost. In one embodiment, restoration manager 217 of the source node, upon receipt of a search message with a set failure indication flag, places the particular circuit which has failed on a failed restoration circuit list.

In another embodiment, restoration manager 217 of the source node increments a search counter for the circuit upon receipt of a search message with a set failure indication flag. The search counter indicates the number of times that a search for a valid nodal pathway for the circuit has been undertaken by the source node. Also, provided that a predetermined value for the number of searches conducted is not exceeded, restoration manager 217 of the source node places the circuit on super low priority list of search set of work lists 231. If the predetermined value for the number of searches conducted is exceeded, restoration manager 217 of the source node places the circuit on a failed restoration circuit list.

If restoration manager 217 of the destination node receives a new search message after it has sent a search complete message with a set failure indication flag, one of the following actions is taken. 1) If the later received search message is for a nodal pathway having a finite cost, i.e., a valid nodal pathway, restoration manager 217 places the CIRCUIT_STATE element for the circuit on connect set of work lists 235. Once the circuit is successfully connected back to the source node, connect function 225 of the source node checks if a CIRCUIT_STATE element for the circuit was listed on the SL work list of search set of work lists 231, or on the failed restoration circuit list and, if so, it is deleted therefrom. 2) If the search message received at restoration manager 217 of the destination node is for a nodal pathway that has infinite cost and an indicator showing that it was part of the same search attempt as previously received search messages, the search message is discarded. 3) If the search message received at restoration manager 217 of the destination node is for a nodal pathway having infinite cost and an indicator showing that it was not part of the a search attempt for which previous search messages have been received, search function 223 prepares a search complete message to be sent to the source node along the nodal pathway of the just received search message. At the source node, upon receipt of the search complete message, search function 223 increments the search count. It also peeks into search set of work lists 231 and the failed restoration circuit list to see if a CIRCUIT_STATE element for the circuit is found therein. The value of the search count in the CIRCUIT_STATE element is updated. Also, if the CIRCUIT_STATE element for the circuit is found on search set of work lists 231 and the search value of the search count stored is greater than a predetermined value the CIRCUIT_STATE element is deleted from search set of work lists 231 and placed on the failed restoration circuit list.

For each circuit in the destination node, restoration manager 217 stores the nodal pathways of the routes found that have at least connectivity to the source node. Up to predetermined maximum number of routes are stored. The number of routes stored is at the discretion of the implementer. One possible implementation stores five routes. The routes are arranged according to cost from lowest to highest. As described above, the minimax factor is employed as a tie breaker. Also, restoration manager 217 keeps track of which of the routes in the list were supplied to connect function 225.

For the CIRCUIT_STATE element at the top of the highest priority nonempty connect set of work lists 235 in the destination node, connect function 225 checks its associated DCS for an available digroup and channel to connect the destination to the immediately preceding node. As noted, it is assumed that there is not a valid pathway directly between source node DACS II 110-3 and destination node DACS II 110-2. However, valid search messages were received by destination node DACS II 110-2 from source node DACS II 115-11 via links 113-6, 111-10 and 113-4. Therefore, restoration processor 115-10 checks DACS II 110-2 for an available digroup and channel that connect back to DACS IV-2000 109-3 via link 113-4. This is the first step in restoring the circuit which will continue to DACS IV-2000 109-1 via link 111-10 to DACS II 110-3 via link 113-6. As previously noted, it is preferred to use spare capacity as the available capacity. However, if there is no spare capacity, preemptable capacity is employed provided that the circuit being restored has preemption authorization.

If spare capacity is available, connect function 225 of the destination node sends to DCS manager 203, via restoration manager 217, a message requesting that the destination be connected to the immediately preceding node in the nodal pathway. It is assumed that the original capacity, over which the circuit had initially been provisioned from DACS II 115-10 to DACS II 110-3, i.e., via DACS IV-2000 109-3 and link 113-4, is still available after having been taken down during the takedown phase of the process. DCS manager 203 formulates an appropriate message to establish a cross-connection between the selected input and output digroup and channel of its associated DCS. It supplies the message to the DCS via link 241. The DCS implements the actual connection upon receipt of the message.

In this example, DACS II 110-2 would reconnect the channel in link 113-7, from which the circuit originates, to the same channel of link 113-4 in which the circuit was previously carded. For other failures, the connection could be to any channel reaching DACS IV-2000 109-3.

As soon as connect function 225 determines that there is an available digroup and channel for connecting the destination to the immediately preceding node, restoration manager 217 supplies the selected digroup and channel information, to distributed communications manager 205. This is done even before the connection information is supplied to DCS manager 203, so that the one of restoration processors 115 of the node next specified in the selected nodal pathway, over which the circuit is intended to be restored, can immediately begin the appropriate processing to establish the connections required of it. Such immediate processing decreases the restoration time for the entire circuit and thereby reduces the chances that all the resources between any nodes that are expected to be employed become unavailable.

In accordance with an aspect of the invention, this digroup and channel information is placed on the super high priority work list of distributed communications set of work lists 249 rather than on the bottom of the work list having the same priority level as the restoration priority of the circuit. Placing information for a message on the super high priority list is known as "broadcast". Broadcasting of a message essentially guarantees that the broadcasted message is the next message transmitted. In accordance with another aspect of the invention, all takedown messages received from a previous node and all connect messages further destined to another node are broadcast by distributed communications manager 205. In the case of takedown messages, the takedown message is placed on the super high priority list of distributed communications set of work lists 249 even before it is supplied to takedown function 221.

If preemption of resources by a circuit being restored is authorized, and connect function 225 needs a resource to a specific node to which there is no available spare capacity, in accordance with an aspect of the invention, connect function 225 has restoration manager 217 check in takedown set of work lists 229 (excluding the SH priority list) to determine if any capacity to the next node in the pathway is to be made available by being taken down. If such capacity exists, the corresponding CIRCUIT_STATE element is placed in the super high priority work list of takedown set of work lists 229. Therefore, that capacity is essentially processed and taken down immediately. By freeing the resource immediately, the connecting circuit need not preempt another circuit nor need it quit because of no capacity to the node. This checking and increasing of priority is called the "peek ahead" function. An advantage of the peek ahead function is that circuit disruption is minimized if it has already been determined that a circuit must be taken down and the resources it had employed are to, thereby, be released.

If there is no spare capacity and no capacity was found by the peek ahead function, connect function 225 searches for regular capacity that can be preempted, if the circuit being restored is authorized to preempt. If such regular preemptable capacity is found, connect function 225 requests restoration manager 217 to invoke takedown function 221 for the CIRCUIT_STATE element specifying which circuit is to be taken down. This CIRCUIT_STATE element is placed in the super high priority work list of takedown set of work lists 229. Thereafter, connect function 225 supplies the connect information, via restoration manager 217, to distributed communications manager 205 for broadcast to the next node in the received nodal pathway. Connect function 225 will also send the required cross-connect information to DCS manager 203, via restoration manager 217, which commands the associated DCS to configure the required connections. Note that when a takedown message is sent to the next node in the nodal pathway, it retains its super high priority for processing in the next node. However, any further nodes will process the takedown of this circuit, according to its regular restoration priority.

As an illustration, suppose, a connect message is received by restoration processor 115-5, associated with DACS IV 109-3, for the circuit described above that failed in link 113-5. If the nodal pathway of the received connect message specifies that the circuit is to be restored via links 111-10 through DACS IV-2000 109-1 to link 113-6, restoration processor 115-5 will seek capacity to connect the digroup and channel on which the circuit arrives at DACS IV 109-3 from link 113-4 to an available digroup and channel of link 111-10. If capacity is available, restoration processor 115-5 broadcasts the digroup and channel to restoration processor 115-3 associated with DACS IV-2000 109-1. Also, a message is formed by DCS manager 203 of restoration processor 115-5 that, when sent via link 241 to DACS IV-2000 109-3, will cause the cross-connection of the digroup and channel on which the circuit arrives from link 113-4 to the found available capacity.

If there is no available capacity from DACS IV-2000 109-3 to DACS IV-2000 109-1, restoration processor 115-5 peeks ahead into its takedown set of work lists 229 (excluding the SH priority list) to determine if there is a CIRCUIT_STATE element indicating that a currently in use channel between DACS IV-2000 109-3 and DACS IV-2000 109-1 is to be taken down. If a channel is to be taken down, the corresponding CIRCUIT_S-TATE element is placed on the super high priority list of takedown set of work lists 229 of restoration processor 115-5. The connect information, indicating that the circuit will be restored over the channel being taken down in link 111-10, is broadcast to restoration processor 115-3. Again, the takedown information must be broadcast to restoration processor 115-5.

Connect 225 of restoration processor 115-5 establishes the cross-connection. If there is no capacity on link 111-10 to be taken down, and the circuit being restored did not have preemption authorization, the restoration fails. A failure message specifying lack of capacity is transmitted to restoration processor 115-10, which is associated with the destination node of the circuit. The destination node can then try the next route on its list of routes.

If there is no capacity on link 111-10 to be taken down and the circuit being restored has preemption authorization, connect 225 tests to determine if there is any capacity on link 111-10 that can be preempted. If there is no capacity on link 111-10 that can be preempted, the restoration fails. A failure message specifying lack of capacity is transmitted to restoration processor 115-10 associated with the destination node of the circuit. The destination node can then try the next route on its list.

If there is capacity on link 111-10 that can be preempted, restoration manager 217 places a CIRCUIT_STATE element for the circuit employing that capacity, at the request of connect function 225, on the super high priority work list of takedown set of work lists 229 in restoration processor 115-5. This causes the circuit employing the channel being preempted to be taken down, thereby releasing the channel for use by the circuit being restored. Also, a takedown message is sent with super high priority to restoration processor 115-3. However, any further nodes will process the takedown of this circuit according to its restoration priority, not with super high priority.

When a connect message arrives at distributed communications manager 205 of an intermediate node of a circuit, restoration manager 217 places a corresponding CIRCUIT_STATE element on the work list of connect set of work lists 235 that has the same priority as the restoration priority of the circuit to be restored. When the CIRCUIT_STATE element for the received connect message becomes the top of the highest priority nonempty work list of connect set of work lists 235, connect function 225 tests to determine if the selected channel in the link to the node from which the connect message originated is still spare. If it is, connect 225 proceeds as it did in the destination node.

If the channels and digroup on the other end of facility are no longer spare, there is contention by two circuits for the same resource, i.e., a glare condition exists. Such a glare condition is caused when each of two circuits that are being or restored from opposite ends of the same link simultaneously attempt to employ the same desired channel for connecting between a pair of nodes. To resolve the glare condition and award ultimate use of the channel, a predetermined strategy is employed to resolve the contention by choosing one of the circuits as the winner and awarding to it the resource contended for. The circuit that is not chosen as the winner is the losing circuit. The losing circuit must be taken down to make the resource available to the winner.

When a glare condition is resolved, restoration manager 217 will receive the connect information for the losing circuit and, in accordance with an aspect of the invention, will insert it back into work list of connect set of work lists 235 having a corresponding priority level to be processed again. Reinsertion occurs up to a predetermined maximum number of times, e.g., 3. Improved glare processing has the advantages of reducing the number of search messages in the network and improving the connect rate. The connect rate is improved because the chances of not contending for resources are better the second or third time that a circuit tries to connect from the same node.

In accordance with an aspect of the invention, an improved contention resolution strategy is as follows. If both circuits are a single channel, the winning circuit is the one of the contenders that can clearly be distinguished on the basis of having the first listed one of the following characteristics: higher restoration priority, most hops to the point of contention, most glare attempts, lowest circuit identifier. If one circuit is wideband and the other is a single channel, then the circuit with the higher restoration priority wins. If the circuits both have the same restoration priority, the circuit with the greater number of channels wins. If both circuits are wideband, then the winning circuit is that one of the contenders which can clearly be distinguished on the basis of having the first listed one of the following characteristics: higher restoration priority, most hops to the point of contention multiplied by the number of channels per circuit, most glare attempts, most search attempts, lowest circuit identifier.

The circuit losing the glare resolution is required to yield the channel contended for by taking down the cross-connection through the DCS to the channel. A CIRCUIT_STATE element for the circuit to be taken down is placed in the super high priority work list of takedown set of work lists 229. This causes the cross-connection which initially caused the contention to be taken down. It also causes the transmission of a takedown message specifying glare to the preceding node in the nodal pathway of the circuit which lost the glare resolution.

Distributed communications manager 205 of the previous node of the circuit losing the glare contention receives the circuit takedown message specifying glare and forwards it immediately to restoration manager 217 for placement on the super high priority work list of takedown set of work lists 229. Takedown function 221 sends a message to restoration manager 217, to increase the glare attempts number for the circuit. Also, restoration manager 217 sends a message to connect function 225 to attempt to reconnect the glared circuit back to the node from which it was just disconnected. Connect function 225 places the circuit to be reestablished on its set of work lists 235 in the usual manner.

When the losing glaring circuit becomes the top of the highest priority non-empty work list of connect set of work lists 235, connect function 225 looks for any spare or preemptable capacity to the next node, i.e., the one in which the glare previously occurred and to which the circuit wishes to reconnect. If capacity is available, connection proceeds in the usual manner as described above.

In accordance with an aspect of the invention, if no spare or preemptable capacity is available after a predetermined number of connection attempts, the CIRCUIT_STATE element for the glare losing circuit for which there is no capacity is placed on the work list of takedown set of work lists 229. When the CIRCUIT_STATE element of the glare losing circuit becomes the top of the highest priority nonempty one of takedown set of work lists 229, takedown messages are broadcasted along the nodal pathway back to the destination node of the circuit which lost the glare contention. The reason specified as the cause of the failure is no capacity available. All the connections on the circuit from the destination node of the glare losing circuit to the node in which the glare contention was lost are taken down, as described above for a failed circuit. The one of restoration processors 115 at the destination node can try to restore the circuit over an alternate nodal pathway from its list of nodal pathways stored in its restoration manager 217.

For example, if in addition to the first circuit that failed, described above, having its source node in DACS II 110-3 and its destination node in DACS II 110-2 and traversing link 113-5, assume that a second circuit, having its source node in DACS II 110-2 and its destination node in DACS II 110-3 and following the same path, but in reverse, also fails simultaneously, at link 113-5. Further assume that all links are full with non-preemptable circuits, except that one spare channel is available on each of links 113-4, 111-10 and 113-6. Moreover, assume that the first circuit has a higher restoration priority.

Each circuit is processed through a takedown phase and a search phase. The destination nodes of each circuit identifies the single available path. The first circuit connects from link 113-7 to link 113-4 and the second circuit connects from link 113-8 to link 113-6. If the second circuit connects through DACS IV-2000 109-1 to the available channel on link 111-10, before the first circuit can connect to it, when the first circuit arrives at restoration processor 115-3, it will see that the channel that it intended to connect to is no longer available. Therefore, the circuits glare with each other and glare processing is invoked.

Restoration processor 115-5 will determine that the first circuit has a higher restoration priority. Therefore, it is the winner of the contention resolution and should be granted access to the channel, which is already the case at DACS IV-2000 109-3. As a result, restoration processor 115-5 does nothing. Furthermore, the CIRCUIT_STATE element for the second circuit will be placed on the super high priority work list of takedown set of work lists 229 in restoration processor 115-3. Connect 225 of restoration processor 115-5 can thereafter connect link 113-4 to the channel on link 111-10 through DACS IV-2000 109-3, in the fashion described above.

Restoration processor 115-3 will determine that the second circuit should yield the glared resources to the first circuit, and, therefore, it will disconnect those resources. Thereafter, it places a CIRCUIT_STATE element for the second circuit on its work list of connect set of work lists 235 that has the same priority as the second circuit. This is so that it can reattempt to connect the second circuit to DACS IV-2000 109-3 as described above. However, if there are no further changes in the network, when the CIRCUIT_STATE element for the second circuit reaches the top of the highest priority nonempty work list of connect set of work lists 235, connect 225 of restoration processor 115-3 will determine that there is no available capacity. Therefore, a CIRCUIT_STATE element for the second circuit will be placed on the bottom of the work list of takedown set of work lists 229 that has the same priority level. This will eventually cause the second circuit to be taken down back to DACS II 110-3, its destination node.

Restoration processor 115-11 may choose to attempt to restore the second circuit via an alternate route. However, all possible alternate routes will return no capacity available. Since the first circuit is connecting over the same path from which the second circuit is being taken down, it is possible in that the connection through DACS IV-2000 109-1 or DACS II 110-3 would not yet have been taken down at the time that the first circuit attempts to connect through them. In that case the peek ahead function would be invoked and the second circuit would wait until the takedown was complete.

The source node of a circuit, e.g., DACS II 110-3, for the first circuit, upon receiving the connect message, connects the channel and digroup connected to the source multiplexer to the preceding intermediate node in the same manner as described above. Thereafter, restoration manager 217 of the restoration processor 115 associated with the source node logs successful restoration of the circuit and the duration of the circuit disruption.

To speed up the restoration procedure, in accordance with an aspect of the invention, prior to the process of searching for a path over which the failed circuit can be restored, a so-called "quick fix one" is attempted. In a quick fix one, the restoration processor 115 associated with source node tests to determine if the destination node is an immediate neighbor of the source node. If the destination is an immediate neighbor, the source node looks for spare or preemptable capacity directly to the destination node. If capacity is available, the process of searching for a valid nodal pathway between source and destination is skipped. Instead, restoration manager 217 of the source node supplies information concerning the available capacity, as a nodal pathway to connect function 225. Thereafter the source node functions in the role described above for a destination node to establish a connection to the actual destination node, which functions in the role of a source node.

For example, for the first circuit described above, restoration processor 115-11, associated with the source node of the circuit, determines that the destination node of the circuit, DACS H 110-2 is directly adjacent to source node DACS II 110-3 via link 113-2. Restoration processor 115-11 tests to determine, via connect function 225, if them is any spare or preemptable capacity on link 113-2 over which a direct connection could be established. Until this point, it has been assumed that no such capacity exists. Therefore, the entire restoration process was needed to restore the circuit. If such capacity exists, however, connect function 225 is supplied with a CIRCUIT_STATE element specifying the destination, DACS II 110-3, as the nodal pathway. Restoration processor 115-11 thereafter acts as if it were the restoration processor or associated with a destination node.

In accordance with another aspect of the invention, when a break occurs between two nodes, at least one of which is an intermediate node, prior to initiating the above-described restoration process (which includes the performance of a quick fix one), a so-called "quick fix two" is attempted. A quick fix two directly restores the circuits between the nodes detecting the failure. One node becomes a pseudo source node and one becomes a pseudo destination node, in accordance with a predetermined protocol that is defined by the implementer. Which node becomes the pseudo source and which node becomes the pseudo destination is immaterial as long as there is only one pseudo source node for all circuits between the nodes and one pseudo destination for all circuits between the nodes. A quick fix one is then attempted for each circuit between the pseudo source and the pseudo destination. Those circuits that cannot be restored via a quick fix two are thereafter processed by the entire restoration procedure as described above.

An advantage of this quick fix two technique is that it reduces the number of search messages that are generated. Furthermore, it restores circuit services much faster. Thus, if there was no available capacity on link 113-2 but there was available capacity that had not failed on link 113-5 when part of link 113-5 failed, a quick fix two would be initiated between restoration processor 115-11 and restoration processor 115-4 to reroute the circuit from the channel that failed to another channel.

In accordance with an aspect of the invention, the network is divided into network layers 101, 103 and 105, as described above. The layers are arranged hierarchically, the ordering criterion of the hierarchy being the transmission resources available in each layer. As shown in FIG. 1, network layer 101 is the highest level, having transmission and switching at the DS3 rate, network layer 103 is the intermediate level, having transmission at the DS3 level, and switching at the DS1 level and network layer 105 is the lowest level having transmission at the DS1 level and switching at the DS0 level and, optionally at the subrate level.

In accordance with an aspect of the invention, restoration is cascaded by causing the highest level of the network to be restored first. Thereafter, restoration precedes sequentially downward to each lower network level. For purposes of cascaded restoration, the boundaries between each of network levels 101, 103 and 105 are employed to define source and destination nodes, as noted above.

In one embodiment of cascaded restoration, there is a dialog to coordinate the restoration process between neighboring restoration processors of the different network levels. Initially, the highest network level tells the lower network levels to wait while it attempts restoration of failed circuits at its level. If the highest network level fails to achieve restoration of all the disrupted circuits, it informs the next lower level network to attempt restoration of any remaining disrupted circuits. The process continues until the lowest network level is reached or all the disrupted circuits are restored. In an alternative embodiment, each lower network level is designed to wait before attempting restoration until it is commanded to do so by a higher network level.

For example, assume five DS1s within link 113-5 have failed, and, furthermore, these DS1s are carded on a DS3 circuit between DACS IV-2000 109-2 and 109-3 to DACS II 110-2. Also, assume that restoration processors in network level 103 succeed in restoring four of these five DS1 circuits. As a result, restoration processor 115-4 will tell restoration processor 115-11 that the circuits on only one of the DS1s in alarm require restoration. Restoration processor 115-11 will then begin the restoration of those circuits on that failed DS1.

In accordance with an aspect of the invention, a DCS time-out employed in the prior art is eliminated from the algorithm by keeping the DCS continually busy. To this end, DCS manager 203 maintains a predetermined number N of DCS commands outstanding during times of restoration. When no cross-connection set up or disconnect messages are needed during times of restoration, DCS manager 203 transmits DCS query messages to the DCS, so as to continually keep N messages outstanding. Acknowledgment by the DCS of the (i+1)st message before the ith message indicates loss of the ith message. Such an acknowledgment indicates the loss or failure of the command within the ith message.

If the communication link between adjacent processors fails, then an attempt is made to restore the failed circuit by performing a quick fix one. If the quick fix one does not work, the circuit is placed at the top of the SH priority list of search set of work lists 231.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A restoration processor associated with at least one digital cross-connect system of a node in a network, said restoration processor being for use in distributed restoration of communications circuits in said network, said restoration processor comprising:

a plurality of manager modules, each of said manager modules for managing a particular aspect of a distributed control restoration process, each of said manager modules not being directly interconnected; and a restoration manager for coordinating said plurality of manager modules and providing at least communications capabilities between said manager modules.

2. The apparatus as defined in claim 1 wherein said plurality of manager modules includes at least one user interface manager module for managing information flow to and from a user interface.

3. The apparatus as defined in claim 1 wherein said a plurality of manager modules includes at least one digital cross connect manager module for controlling interconnections in said digital cross-connect system.

4. The apparatus as defined in claim 3 wherein said digital cross-connect manager module sends messages sequentially to said at least one digital cross-connect system, each of said messages being acknowledged in turn by said digital cross-connect system and wherein, during periods of time that said restoration processor is engaged in the restoration of circuits, said digital cross connect manager module maintains a predetermined number of messages unacknowledged by said digital cross-connect system.

5. The apparatus as defined in claim 4 wherein receipt of an acknowledgment for any of said messages out of sequence from the order in which said original messages were sent indicates a failure of the digital cross-connect system to successfully perform any commands contained in messages sent between the message last acknowledged at its proper point in the sequence and said message acknowledged out of sequence.

6. The apparatus as defined in claim 1 wherein said plurality of manager modules includes at least one core algorithm manager module for determining circuit connectivity of at least one of said communication circuits.

7. The apparatus as defined in claim 6 wherein said at least one core algorithm manager module includes a plurality of independent functions that are each independent of the others.

8. The apparatus as defined in claim 7 wherein said plurality of independent functions includes a monitor function.

9. The apparatus as defined in claim 7 wherein said plurality of independent functions includes a takedown function.

10. The apparatus as defined in claim 7 wherein said plurality of independent functions includes a search function.

11. The apparatus as defined in claim 10 wherein one or more of said communications circuits is made up of multiple portions and wherein said search function includes:
- means for determining if there exists sufficient capacity, between said node and an adjacent node, to restore a portion of one of said communications circuits; and
- means for relaying a search message to said adjacent node identifying said one of said communications circuits and indicating no capacity available if a determination by said means for determining is NO.

12. The apparatus as defined in claim 11 wherein an infinite cost is used as the indication of no capacity available.

13. The apparatus as defined in claim 10 wherein said search function includes:
- means for determining from information contained in a search message received at said node if there exists insufficient capacity to restore a particular communications circuit of said communications circuits identified in said search message.

14. The apparatus as defined in claim 13 wherein said network comprises a plurality of nodes, said plurality of nodes including said node in said network, and wherein said means for determining bases its determination on the cost of using a nodal pathway between two of said nodes of said plurality indicated in said search message.

15. The apparatus as defined in claim 14 wherein said determination is that no capacity is available if said cost indicated is infinite.

16. The apparatus as defined in claim 13 wherein said network comprises a plurality of nodes, said plurality of nodes including said node, in said network and wherein said search function further includes:
- means for determining if said restoration processor is associated with a destination node of said particular communications circuit;
- means responsive to both a determination that said restoration processor is associated with a destination node of said particular communications circuit and a determination that there is insufficient capacity to restore said particular communications circuit for causing a search message having both a search failed indication and an insufficient capacity indication to be launched toward a source node of said particular communications circuit.

17. The apparatus as defined in claim 7 wherein said plurality of independent functions includes a connect function.

18. The apparatus as defined in claim 17 wherein said network comprises a plurality of nodes, said plurality of nodes including said node in said network, and wherein said plurality of independent functions also includes a search function that develops a list of valid nodal pathways over which a communications circuit can be restored and wherein said connect function selects the lowest cost nodal pathway for said communications circuit.

19. The apparatus as defined in claim 18 wherein said connect function includes means for selecting the nodal pathway having the largest minimax factor value if more than one of said nodal pathways on said list has the same lowest cost wherein said minimax factor value is computed as the minimum, over all the nodes in a nodal pathway, of the maximum number of spare channels available between each node in the nodal pathway and the next node in the pathway to which it connects.

20. The apparatus as defined in claim 7 wherein at least one independent function of said plurality employs a set of prioritized work lists for storing circuit state information to be processed by said at least one independent function.

21. The apparatus as defined in claim 20 wherein each work list of said set of prioritized work lists is arranged as a queue.

22. The apparatus as defined in claim 6 wherein said core algorithm manager module contains means for resolving a contention for the same resource at said node by two particular communication circuits of said communications circuits in said network, each of said communications circuits in said network having a restoration priority and containing one or more channels, said means for resolving including:
- means for assigning said resource to the one of said particular contending circuits that has a higher restoration priority; and
- means for assigning said resource to the one of said particular contending circuits based on the number of channels contained within each respective one of said particular contending circuits if neither of said particular contending circuits has a higher restoration priority.

23. The invention as defined in claim 22 wherein said network comprises a plurality of nodes, said plurality of nodes including said node in said network, and wherein each of said communication circuits in said network also has a unique circuit identifier number and wherein said means for assigning based on the number of channels includes:
- means for determining if both of said particular contending circuits are single-channel circuits; and
- means responsive to a determination that both of said particular contending circuits are single-channel circuits for assigning said resource to one of said particular contending circuits based on one of the following criteria
  a) having traversed the most nodes to the point of contention,
  b) having the higher number of glare attempts,
  c) having a lower circuit identifier number,
  such that the resource is assigned to the particular contending circuit meeting criterion a) if one of said particular contending circuits is distinguishable by criterion a) other, otherwise assigning said resource to the particular contending circuit meeting criterion b) if one of said particular contending circuits meets criterion b), otherwise assigning said resource to the particular contending circuit meeting criterion c).

24. The invention as defined in claim 22 wherein said means for assigning based on the number of channels includes:
- means for determining that one of said particular contending circuits is a multiple channel circuit and the other is a single channel circuit; and
- means for assigning said resource to the one of said particular contending circuits that is the multiple channel circuit only if it is determined that one of said particular contending circuits is a multiple channel circuit and the other is a single channel circuit.

25. The invention as defined in claim 22 wherein (i) each of said communications circuits in said network has a unique circuit identifier number and (ii) said network comprises a plurality of nodes, said plurality of nodes including said node in said network, and wherein said means for assigning based on the number of channels includes:

means for determining that both of said particular contending circuits are multiple channel circuits; and means responsive to a determination that both of said particular contending circuits are multiple channel circuits for assigning said resource to one of said particular contending circuits based on one of the following criteria
a) having the higher product of the number of traversed nodes to the point of contention multiplied by the number of channels assigned to the circuit;
b) having the higher number of glare attempts;
c) having a lower circuit identifier number; and
such that the resource is assigned to the particular contending circuit meeting criterion a) if one of said particular contending circuits is distinguishable by criterion a) other, otherwise assigning said resource to the particular contending circuit meeting criterion b) if one of said circuits meets criterion b), otherwise assigning said resource to the particular contending circuit meeting criterion c).

26. The apparatus as defined in claim 6 wherein said core algorithm manager module contains means for resolving a contention for the same resource at said node by two circuits including:

means for receiving in said restoration processor a message from a previous node to take down an at least one connection in said particular node associated with a particular circuit path;

means for transmitting to a restoration processor of a next node in said particular circuit path a message to take down an at least one connection in said next node associated with said particular circuit path;

means for taking down connections in said node; and means for causing said means for taking down to begin the taking down of said at least one connection in said node only after causing the initiation of the transmission of said message to said next node.

27. The apparatus as defined in claim 6 including:

means for maintaining a list of resources from said node to adjacent nodes which are scheduled to be taken down, said resources having respective predetermined takedown priorities;

means for determining that a resource to a particular adjacent node is required to establish a particular circuit; and means for checking to determine if there is a resource to said particular adjacent node that is on said list and, if there is, increasing the takedown priority associated with that resource.

28. The invention of claim 27 wherein said predetermined takedown priorities are taken from a predetermined plurality of priority levels, and wherein said means for checking and increasing increases said takedown priority of said resource to the highest of said levels.

29. The apparatus as defined in claim 6 wherein said core algorithm manager module contains apparatus for controlling the re-establishment of a failed circuit, said restoration processor being associated with a first node of said circuit and said circuit including at least a second node, said core algorithm manager module including:

means for determining if said second node is an immediate neighbor of said first node;

means for determining if there is available capacity to said second node if said second node is an immediate neighbor of said first node; and means for establishing a connection via the determined available capacity to said second node if there is such available capacity.

30. The apparatus as defined in claim 1 wherein said plurality of manager modules includes at least one distributed communications manager module for communicating with at least one other restoration processor located in the network.

31. The invention as defined in claim 1, wherein said network is divided into an ordered set of levels, said restoration processor being located within one of said levels and further including:

means for inhibiting said restoration processor from restoring any of said communication circuits until it is determined that no further communication circuits can be restored in any network level higher than said network level in which said restoration processor is located.

32. In a restoration processor associated with a node of a network having a plurality of nodes, said restoration processor being for use in distributed restoration of communications circuits in said network, each of said communications circuits having an assigned restoration priority and being comprised of one or more channels, a method for resolving contention at a point by two particular ones of said communications circuits that are contending for the same resource comprising the steps of:

if one of said particular contending circuits has a higher restoration priority then assigning said resource to the one of said particular contending circuits having said higher restoration priority;

if neither of said particular contending circuits has a higher restoration priority, then assigning said resource to the one of said particular contending circuits based on the number of channels contained within each circuit.

33. The invention as defined in claim 32 wherein said step of assigning based on the number of channels includes the steps of:

determining that both of said particular contending circuits are single-channel circuits; and assigning said resource to the one of said particular contending circuits based on a criterion which is one of
a) which of said particular contending circuits traversed the most nodes to the point of contention,
b) which of said particular contending circuits has the higher number of glare attempts,
c) which of said particular contending circuits has traversed a lower circuit identifier number.

34. The invention as assigned in claim 33 wherein said criterion is criterion a) if one of said particular contending circuits has traversed more nodes than the other, otherwise said criterion is criterion b) if one of said particular contending circuits has more glare attempts than the other, otherwise said criterion is criterion c).

35. The invention as defined in claim 32 wherein said step of assigning based on the number of channels includes the steps of:

determining that one of said particular contending circuits is a multiple channel circuit and the other is single channel circuit; and assigning said resource to one of said particular contending circuits that is the multiple channel circuit.

36. The invention as defined in claim 32 wherein said step of assigning based on the number of channels includes the steps of:

determining that both of said particular contending circuits are multiple channel circuits; and assigning said resource to one of said particular contending circuits based on a criterion which is one of a) which of said particular contending circuits has the higher product of the number of traversed nodes to the point of contention multiplied by the number of channels assigned to that circuit, b) which of said particular contending circuits has the higher number of glare attempts, c) which of said particular contending circuits has a clearly lower circuit identifier number.

37. The invention as defined in claim 36 wherein said criterion is criterion a) if one of said particular contending circuits has the higher product of the number of traversed nodes to the point of contention multiplied by the number of channels assigned to that particular contending circuit, otherwise said criterion is criterion b) if one of said particular contending circuits has more glare attempts than the other, otherwise said criterion is criterion c).

38. In a restoration processor associated with a particular node of a network having a plurality of nodes, said restoration processor being for use in distributed restoration of communications circuits in said network, the method comprising the steps of:

receiving in said restoration processor a message from a previous node to take down an at least one connection in said particular node associated with a particular circuit path;

transmitting to a restoration processor of a next node in said particular circuit path a message to take down an at least one connection in said next node associated with said particular circuit path; and initiating the taking down of said at least one connection in said node only after initiating the carrying out of said transmitting step.

39. In a restoration processor associated with a node of a network having a plurality of nodes, said restoration processor being for use in distributed restoration of communications circuits in said network, the method comprising the steps of:

maintaining a list of resources from said node to adjacent nodes which are scheduled to be taken down, said resources having respective predetermined takedown priorities;

determining that a resource to a particular adjacent node is required to establish a particular circuit; and checking to determine if there is a resource to said particular adjacent node that is on said list and, if there is, increasing the takedown priority associated with that resource.

40. The invention of claim 39 wherein said predetermined takedown priorities are taken from a predetermined plurality of priority levels, and wherein in said checking step said takedown priority of said resource is increased to the highest of said levels.

41. In a restoration processor for use in distributed restoration of a communications circuit, said restoration processor being associated with a first node of a network that includes said first node and a second node, said communications circuit including said first node and said second node, the method comprising the steps of:

determining if said second node is an immediate neighbor of said first node;

if it is, determining if there is available capacity to said second node; and if there is such available capacity, establishing a connection via the determined available capacity to said second node.

42. A method for use in a restoration processor that performs processing for the purpose of restoring communication circuits through a network that is divided into a hierarchy of levels, the method including the steps of:

determining that no further communication circuits can be restored in any network level higher than the one of said network levels in which said restoration processor is located; and beginning said processing.

43. The invention as defined in claim 42 wherein said step of determining includes the step of receiving an indication from a restoration processor in a higher network level than said level that no further communication circuits can be restored in said higher network level.

44. The invention as defined in claim 42 wherein said step of determining includes the step of receiving a command to wait from at least one higher network level while communication circuits are processed at said higher network level.

* * * * *